(12) United States Patent
Chang et al.

(10) Patent No.: US 12,026,505 B1
(45) Date of Patent: Jul. 2, 2024

(54) SEPARATE FIRMWARE TO FIXED AND REMOVABLE STORAGES

(71) Applicant: Auradine, Inc., Santa Clara, CA (US)

(72) Inventors: Lei Chang, Saratoga, CA (US); Nicholas Cabi, San Jose, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/525,622

(22) Filed: Nov. 30, 2023

Related U.S. Application Data

(63) Continuation of application No. 18/370,192, filed on Sep. 19, 2023, now Pat. No. 11,880,223, which is a continuation of application No. 18/222,084, filed on Jul. 14, 2023, now Pat. No. 11,797,295.

(51) Int. Cl.
*G06F 8/654* (2018.01)
*G06F 8/40* (2018.01)

(52) U.S. Cl.
CPC ............... *G06F 8/654* (2018.02); *G06F 8/40* (2013.01)

(58) Field of Classification Search
CPC .................................. G06F 8/40; G06F 8/654
See application file for complete search history.

(56) References Cited

U.S. PATENT DOCUMENTS

2011/0035808 A1    2/2011  Butler et al.
2017/0168786 A1*   6/2017  Beckey ..................... G06F 8/30
2019/0340379 A1   11/2019  Beecham
2023/0351056 A1*  11/2023  Marando ................. G06F 21/64

FOREIGN PATENT DOCUMENTS

KR      20080098437 A    11/2008

OTHER PUBLICATIONS

Konstantinou et al., "PHYLAX: Snapshot-Based Profiling Of Real-Time Embedded Devices Via JTAG Interface", [Online] pp. 869-872, [Retrieved From Internet On Sep. 9, 2023], (Year: 2018).
United States Patent and Trademark Office, U.S. Appl. No. 18/222,084, Notice of Allowance dated Sep. 18, 2023.
United States Patent and Trademark Office, U.S. Appl. No. 18/370,192, Notice of Allowance dated Nov. 22, 2023.

* cited by examiner

*Primary Examiner* — Ziaul A Chowdhury
(74) *Attorney, Agent, or Firm* — Shield Intellectual Property PC; Zhichong Gu

(57) ABSTRACT

A first firmware source code portion corresponding to an immutable firmware portion of specific firmware to be deployed with embedded devices is identified. A second different firmware source code portion corresponding to a mutable firmware portion of the specific firmware to be deployed with the embedded devices is identified. The first firmware source code portion is used to generate the immutable firmware portion of the specific firmware. The second firmware source code portion is used to generate the mutable firmware portion of the specific firmware. The immutable firmware portion of the specific firmware is caused to be installed in fixed storage drives of an embedded device in the embedded devices. The mutable firmware portion of the specific firmware is caused to be installed in swappable storage drives of the same embedded device.

21 Claims, 7 Drawing Sheets

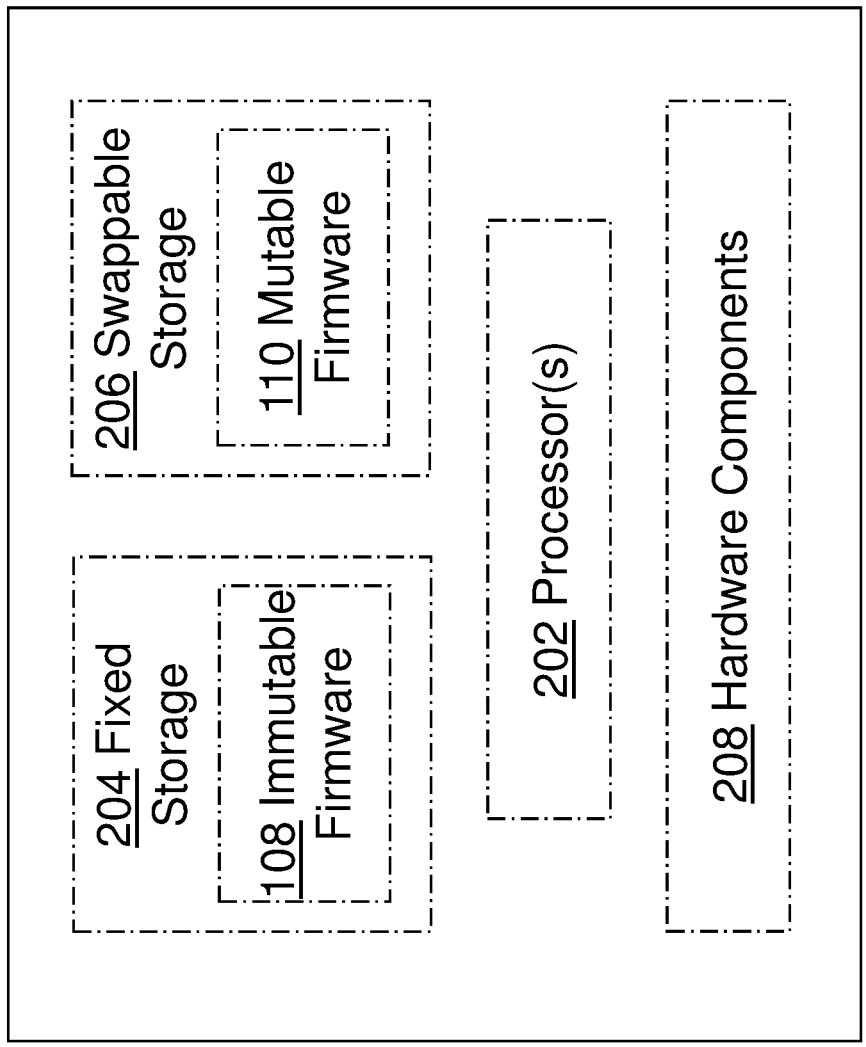

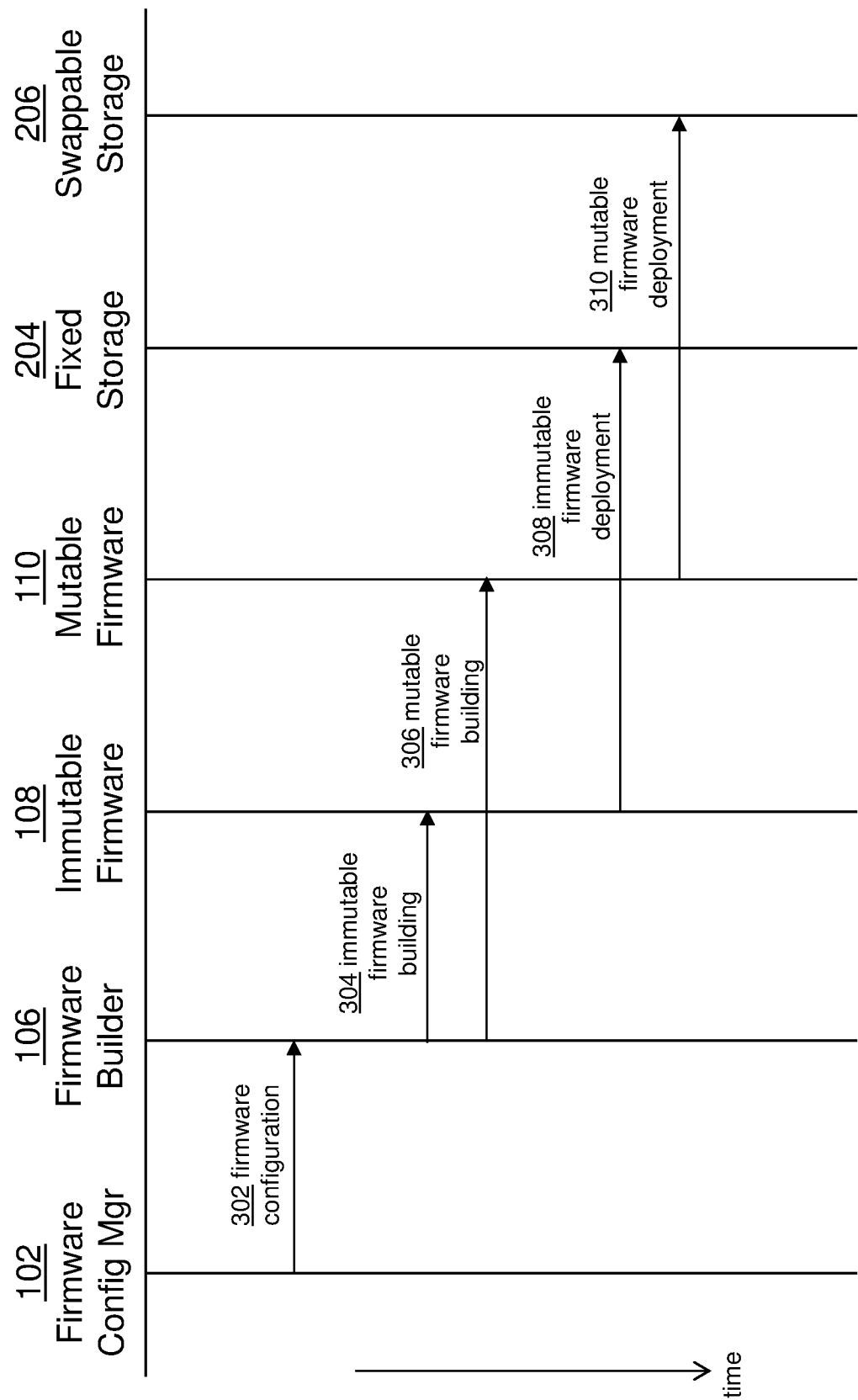

SEPARATE FIRMWARE TO FIXED AND REMOVABLE STORAGES

PRIORITY CLAIM

This application claims benefit as a Continuation of application Ser. No. 18/370,192, filed Sep. 19, 2023, which is a continuation of application Ser. No. 18/222,084, filed Jul. 14, 2023, the entire contents of the aforementioned are hereby incorporated by reference as if fully set forth herein, under 35 U.S.C. § 120. The applicant hereby rescind any disclaimer of claim scope in the parent application or the prosecution history thereof and advise the USPTO that the claims in this application may be broader than any claim in the parent application.

TECHNICAL FIELD

Embodiments relate generally to computing systems, and, more specifically, to separate firmware to fixed and removable storages in computing systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Flash memory devices like NAND or NOR flash are widely used in a variety of computing applications including but not limited to embedded systems for low costs, high capacities and fast read/write speeds.

However, all kinds of flash chips have a relatively short life cycle of how many erase or write times these chips can support, resulting in a high rate of sporadic sector errors after systems including these chips have been running after a while, especially in operational scenarios in which frequent or constant logging or changes in flash memory are needed. This significantly increases return material authorization (RMA) rates as percentiles of manufacturing to system providers as well as operation costs to end users.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 2 illustrates an example computing device or embedded device;

FIG. 3A through FIG. 3C illustrate example firmware building and deployment operations;

DETAILED DESCRIPTION

Figure 1:
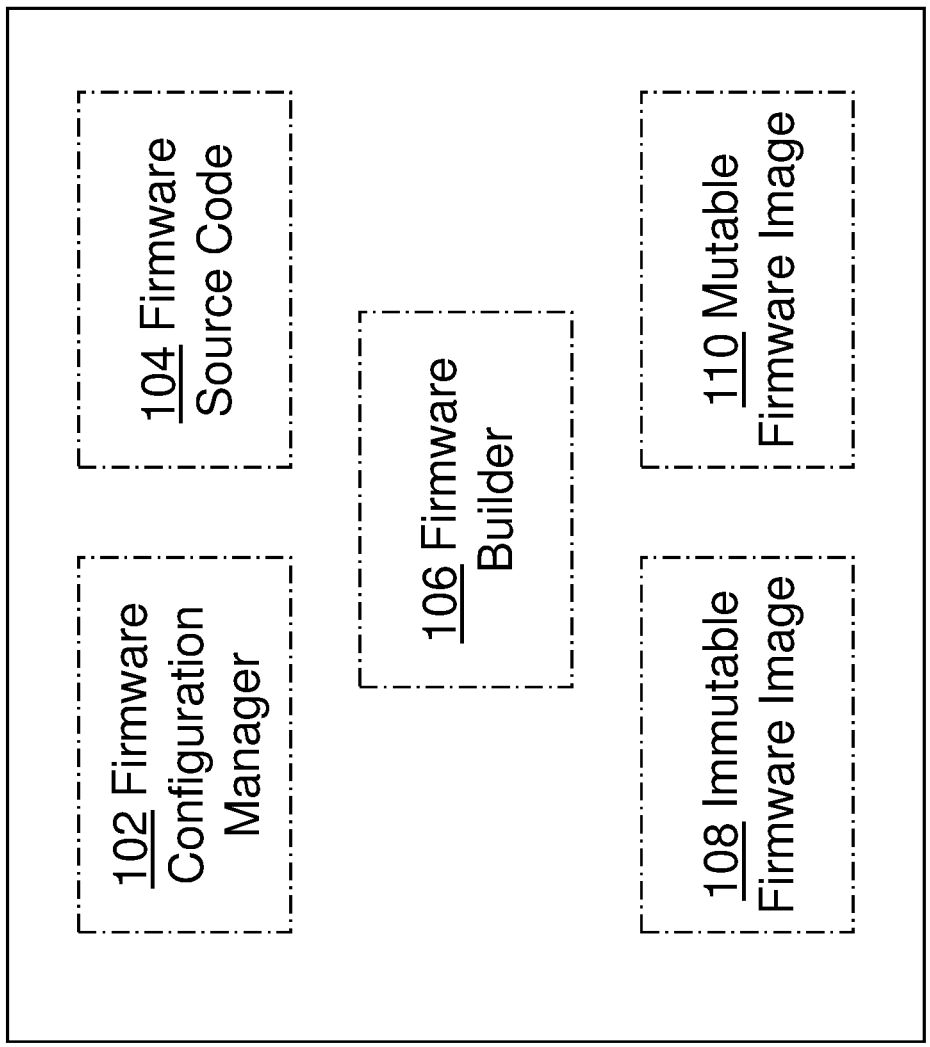
FIG. 1 illustrates an example firmware (image) generation system.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
   2.1. Configuration Manager
   2.2. Source Code
   2.3. Firmware Builder
   2.4. Embedded Device
   2.5. Embedded Processor(s)
   2.6. Fixed Storage
   2.7. Swappable Storage
   2.8. Additional Hardware
   2.9. Miscellaneous
3.0. Functional Overview
   3.1. Firmware Mutability
   3.2. Firmware Deployment
   3.3. Firmware Repairing
   3.4. Firmware Updates
   3.5. Example Process Flows
4.0. Implementation Mechanism-Hardware Overview
5.0. Extensions and Alternatives 1.0. General Overview Under techniques as described herein, specific firmware for embedded devices to carry out specific embedded applications may be partitioned, classified or categorized into different firmware portions based on respective mutability of these firmware portions.

Mutability of a firmware portion in the specific firmware may be measured or determined based at least in part on one or more firmware (portion) determination factors including but not limited to whether the firmware portion is prone to generate write or writeback operations to the storage device hosting the firmware portion, whether the firmware portion is to be updated in the field relatively frequently, whether the firmware portion generates any runtime data such as logging, traces, checkpoints or states to be persisted, whether the firm portion belongs to kernel, loader, other embedded system services or embedded applications, etc.

By way of example but not limitation, the different portions of the specific firmware may include an immutable firmware portion implementing the kernel, loader and or other relatively low level embedded system services that are not changeable for a relatively long time period.

In addition, the different portions of the specific firmware may include a mutable firmware portion that may be updated relatively frequently or may generate runtime changes to the mutable firmware portion or a computer readable media storing the mutable firmware at runtime. For example, the mutable firmware may include firmware components used to implement some or all functions or logics of the embedded applications to carried out by an embedded device loaded or installed with the specific firmware.

These firmware components in the mutable firmware portion of the specific firmware may use templates, metadata, formulas, configurations, curves, functions, etc., that may be subject to relatively frequent changes due to a variety of reasons such as improving functions or performances of the embedded applications, extending scope of the embedded applications to support novel methods or operations, providing support for new industry standards or new proprietary enhancements/specifications, and so on.

Additionally, optionally or alternatively, these firmware components in the mutable firmware portion of the specific firmware may use or generate persisted logs and states to help support high availability or fault tolerant operations when failures or abnormal terminations occur.

While the immutable firmware portion of the specific firmware may be installed with one or more fixed (e.g., firmware, non-volatile, flash memory or storage, non-flash memory or storage, etc.) storage devices of the embedded device, the mutable firmware portion of the specific firmware may be installed with swappable computer readable media or one or more swappable firmware storage devices that are removably connected in the embedded device.

The fixed storage devices to host the immutable firmware portion may be affixed to or connected with a physical support to which a main processor or other components/devices are affixed. The embedded device or system may have one or more physical connectors into which the swappable drives or storage devices such as a flash drive or microSD card can be removably installed or inserted.

A new or reprogrammed version of the mutable firmware portion can be downloaded to a swappable drive or storage device relatively easily in the field. Simple copy-and-paste operations may be performed to program the swappable drive or storage device such as a flash drive or microSD card with the new or reprogrammed version of the mutable firmware portion.

In some operational scenarios, the mutable firmware portion of the specific firmware can be reprogrammed or updated without causing any change or reprogramming of the immutable firmware. The immutable firmware portion can continuously operate relatively smoothly, automatically and seamlessly. At the firmware build time, updates to firmware source code may be used to identify which firmware artifacts, packages, units or files have been changed. Changes to executables of the specific firmware caused by the source code changes may be included in a mutable firmware portion to be released to the field. Hence, in some operational scenarios, even if a function or logic has been added, updated or changed in the mutable and/or immutable firmware portion(s), such function or logic can be provided to or updated into the embedded device by way of a swappable storage drive with no or minimized impact to the concurrent normal operations of the embedded device.

Approaches, techniques, and mechanisms as described herein generating and deploying firmware in computing systems. A first firmware source code portion corresponding to an immutable firmware portion of specific firmware to be deployed with one or more embedded devices is identified. A second different firmware source code portion corresponding to a mutable firmware portion of the specific firmware to be deployed with the one or more embedded devices is identified. The first firmware source code portion is used to generate the immutable firmware portion of the specific firmware. The second firmware source code portion is used to generate the mutable firmware portion of the specific firmware. The immutable firmware portion of the specific firmware is caused to be installed in one or more fixed storage drives of an embedded device in the one or more embedded devices. The mutable firmware portion of the specific firmware is caused to be installed in one or more swappable storage drives of the same embedded device.

In other aspects, the inventive subject matter encompasses computer apparatuses and computer-readable media configured to carry out the foregoing techniques.

2.0. Structural Overview

FIG. 1 illustrates an example firmware (image) generation system (or device) 100 in an embodiment. The firmware generation system 100 comprises firmware (image) configuration manager 102, firmware source code 104, firmware (image) builder 106, and so on. The firmware generation system 100 may be implemented with one or more computing devices or systems. Some or all of the processing components described herein are implemented in one or more of: central processing units (CPUs), application-specific integrated circuits (ASICs), field programmable gate arrays (FPGAs), microcontrollers, graphics processing units (GPUs), or other integrated circuit(s). Some or all of the processing components may include one or more memories storing instructions for implementing various components described herein, one or more hardware processors configured to execute the instructions stored in the one or more memories, and various data repositories in the one or more memories for storing data structures utilized and manipulated by the various components.

In various operational scenarios, the firmware generation system 100 may include more or fewer processing components than illustrated in FIG. 1. For example, the firmware generation system 100 may include computing devices or processing components in addition to or in place of the firmware configuration manager 102, firmware source code 104, firmware builder 106, and so on.

The firmware generation system 100 may be operatively connected with one or more other computing systems through one or more data/network communication interfaces over a network of a plurality of computers or nodes.

2.1. Configuration Manager

The firmware generation system 100 may comprise a firmware configuration manager 102 that operates with the firmware source code 104 and firmware builder 106 to generate firmware images for one or more embedded devices (e.g., 200 of FIG. 2, etc.). The firmware images may be generated by the firmware generation system 100 at different time points, for example, corresponding to different releases, different versions, different sub-versions, different updates/patches, etc. of specific (e.g., system, device, etc.) firmware for the embedded devices.

The firmware configuration manager 102 may track and/or control specific changes—including changes/additions/enhancements/supports for new features and/or for new hardware components in the embedded devices as well as minor or major modifications or revisions for bug fixes—in the firmware source code 104, establish source code baseline releases/versions and update/patch releases/versions of the specific firmware, and provide (e.g., compile time, link time, etc.) directives and/or operational parameters in a firmware (image) building process executed with the firmware builder 106.

Under techniques as described herein, the specific firmware for the embedded devices includes (e.g., consists of, is composed of, etc.) at least two firmware portions: an immutable firmware portion and a mutable firmware portion. The directives and/or operational parameters in the firmware building process, as specified, defined or provided by the firmware configuration manager 102, may include specifications of which firmware feature packages, files, code portions, artifacts, etc., in the firmware source code 104 belong to the immutable firmware portion and of which other firmware feature packages, files, code portions, artifacts, etc., in the firmware source code 104 belong to the mutable firmware portion.

2.2. Source Code

The firmware generation system 100 may comprise or access a source code repository that provides the firmware source code 104 to be built by the firmware builder 106 into specific firmware (image) or firmware (image) portions thereof for one or more embedded devices (e.g., 200 of FIG. 2, etc.).

The firmware source code 104 may include source code artifacts, packages, units or files—written in one or more relatively high level computer languages—that are used to build various firmware image parts or portions (e.g., executable files storing computing machine-level instructions and data attendant to the instructions, in an executable and linkable format (ELF), etc.) of the specific firmware such as kernel, loader, other basic or low-level embedded system services and embedded applications supported by the kernel, loader, other basic or low-level embedded system services.

2.3. Firmware Builder

The firmware generation system 100 may comprise a firmware (image) builder 106, which may be used to access or receive directives and/or operational parameters relating to the firmware source code 104 or one or more firmware build processes to be executed or carried out by the firmware builder 106 from the firmware configuration manager 102, access or receive some or all of the firmware source code 104 in a code repository, and carry out the firmware build processes to build one or more versions/releases of specific firmware for one or more embedded devices (e.g., 200 of FIG. 2, etc.).

Each of the versions/releases of the specific firmware (images) generated by the firmware builder 106 may represent one of a major version/release or a minor version/release and include one or both of: an immutable firmware (image) portion 108 and a mutable firmware (image) portion 110.

The directives and/or operational parameters as received from the firmware configuration manager 102 may be used by the firmware builder 106 to identify which firmware source code artifacts, packages, units or files are to be included, compiled or linked into the immutable firmware portion 108, which other firmware source code artifacts, packages, units or files are to be included, compiled or linked into the mutable firmware portion 110, etc.

In some operational scenarios, the mutable firmware (image) portion 110 may be copied, installed or updated into a swappable firmware storage device such as a swappable (e.g., portable, non-fixed, etc.) flash storage or memory device. The flash storage or memory device may be removably disposed or connected to a physical connector in an (e.g., intended, targeted, built for, etc.) embedded device. The swappable flash storage or memory device or the mutable firmware portion 110 thereon may be removed, disconnected, switched, or hot swappable concurrently while the embedded device is operating in the field with no or minimal downtime.

In comparison, the immutable firmware (image) portion 108 may be installed or updated into a fixed firmware storage device such as a non-swappable (e.g., non-portable, fixed, flash, non-flash, etc.) storage or memory device. The non-swappable storage or memory device may be permanently affixed to a mechanical support or physical housing as a part of the embedded device. As a result, programming, re-programming, or updating the immutable firmware (image) portion 108 in the field may entail a relatively long downtime (e.g., more than one minute, relatively long as compared with programming, re-programming, or updating the mutable firmware (image) portion 110 in the field, etc.), as the non-swappable storage or memory device or the immutable firmware portion 108 thereon may not allow or support removing, disconnecting, switching, or hot swapping while the embedded device is operating in the field.

2.4. Embedded Device

FIG. 2 illustrates an example computing device or embedded device 100 in an embodiment. The embedded device 200 comprises one or more computing processors 202 (e.g., CPUs, controllers, microcontrollers, etc.), one or more fixed storage devices 204, one or more swappable storage devices 206, (additional) hardware components 208, and so on. Some or all of the processing components described herein are implemented in one or more of: central processing units (CPUs), application-specific integrated circuits (ASICs), field programmable gate arrays (FPGAs), microcontrollers, graphics processing units (GPUs), or other integrated circuit(s). Some or all of the processing components may include one or more memories storing instructions for implementing various components described herein, one or more computing or hardware processors configured to execute the instructions stored in the one or more memories, and various data repositories in the one or more memories for storing data structures utilized and manipulated by the various components.

In various operational scenarios, the embedded device 200 may include more or fewer processing components than illustrated in FIG. 2. For example, the embedded device 200 may include computing devices or processing components in addition to or in place of the computing processors 202, fixed storage devices 204, swappable storage devices 206, hardware components 208, and so on.

The embedded device 200 may be operatively connected with one or more other computing systems through one or more wired or wireless communication interfaces over a network of a plurality of computers or nodes.

As used herein, an embedded device (e.g., 200 of FIG. 2, etc.) may refer to a special purpose computing device (as opposed to general purpose computers such as personal computers, laptop computers, etc.). The embedded device may or may not have its own physical housing. In some operational scenarios, an embedded device as described herein may be a standalone device with its own physical housing. In some operational scenarios, an embedded device as described herein may not have its own physical housing. Rather, the embedded device may be a part of an overall computing system physically housed together with other parts of the system and may operate with one or more main or host processors (or processor cores) of the overall system.

The embedded device may be used to implement or support one or more embedded applications including but not necessarily limited to only cryptographic applications, internet-of-things (IOT) applications, etc.

2.5. Embedded Processor(s)

The embedded device 200 may comprise one or more computing processors 202 (e.g., CPUs, controllers, microcontrollers, individual processor/controller logics of hardware components, etc.) that interact or operate with the fixed storage devices 204 and/or the swappable storage devices 206 to access and read computer instructions and/or data of specific firmware such as code or microcode for kernel, loader, other basic or low-level embedded system services and/or one or more embedded applications/programs stored in non-volatile computer readable media in the storage devices 204 and/or 206.

Each of the embedded applications/programs in the specific firmware may invoke various hardware and firmware/software components (e.g., storage devices 204 and/or 206, hardware components 208, kernel, loader, other basic or low-level embedded system services, etc.) of the embedded device 200 during operations of the embedded device 200.

Some or all of the instructions and/or data read from the storage devices 204 and/or 206 for executing the one or more embedded applications/programs may be temporarily maintained or accessed by way of one or more processor caches (level 1 cache, level 2 cache, etc.; not shown) of the computing processors 202.

Additionally, optionally or alternatively, shadow memory may be configured for the storage devices 204 and/or 206 and used by the embedded device 200 or the processors therein to temporarily maintain or access some or all of the instructions and data of the specific firmware whose image is stored in the computer readable media of the storage devices 204 and/or 206. Additionally, optionally or alternatively, the shadow memory may be used by the embedded device 200 or the processors therein to temporarily maintain or access some or all of runtime data used or generated during operations of the embedded device 200.

Some or all of the runtime data generated from the embedded applications or programs may be (e.g., periodically, scheduled, on demand, from time to time, etc.) persisted, written or stored into the computer readable media of the storage devices 204 and/or 206.

2.6. Fixed Storage

The embedded device 200 may comprise one or more fixed storage devices 204 (e.g., non-volatile memories, flash drives/memories, solid state drives or SSDs, NAND or NOR drives/memories, memory cards, EEPROM, etc.) with non-volatile computer readable media that store, or are programed or written with, an immutable firmware portion 108 of the specific firmware.

At runtime, the immutable firmware portion 108 is expected/deemed (e.g., based on user input, based on expert knowledge, etc.) to generate no or few program/write/erase operations to the fixed storage devices 204. Additionally, optionally or alternatively, even when the immutable firmware portion 108 is expected/deemed (e.g., based on user input, based on expert knowledge, etc.) to generate relatively frequent program/write/erase operations per unit time at runtime, the fixed storage devices 204 can well support these operations over a relatively long time period that is comparable with or longer than expected lifetime of the embedded device 200 or that is longer than the time interval between two successive major releases or versions of the specific firmware.

2.7. Swappable Storage

The embedded device 200 may comprise one or more swappable storage devices 206 (e.g., non-volatile memories, flash drives/memories, NAND or NOR drives/memories, memory cards, thumb drives, microSDs, etc.) with non-volatile computer readable media that store, or are programed or written with, a mutable firmware portion 110 of the specific firmware.

At runtime, the mutable firmware portion 110 is expected/ deemed (e.g., based on user input, based on expert knowledge, etc.) to generate relatively frequent program/write/ erase operations to the swappable storage device 206. Hence, it may occur that non-volatile computer readable media in the swappable storage devices 206 may not support these operations over a relatively long time period such as the expected lifetime of the embedded device 200 or the time interval between two successive major releases or versions of the specific firmware.

The swappable storage devices 206 or the computer readable media therein may be removably attached to physical (e.g., electric, mechanical, optical, USB, firewire, etc.) connectors provisioned or disposed permanently in the embedded device 200.

Each of the swappable storage devices 206 may be removed, replaced or swapped in the field with a new (e.g., physically, electrically, mechanically, optically, etc.) compatible swappable storage device by an end user operating the embedded device 200 with no or little interruption or with a relatively limited time window (e.g., a few seconds, less than one minute, etc.) to normal operations of the embedded device 200.

2.8. Additional Hardware

The embedded device 200 may comprise additional hardware components 208 with which the computing processors 202 of the embedded device 200 operate to run the one or more embedded applications/programs deployed with the specific firmware. Example hardware components may include but are not necessarily limited to only: one or more communication interfaces used by the computing processors 202 or other hardware and/or firmware/software components in the embedded device 200 to communicate with one or more other computers or nodes over one or more computer networks, data links or paths using one or more data or network communication protocols.

2.9. Miscellaneous

The foregoing figures illustrate only a few examples in which the techniques described herein may be practiced. Other embodiments may include fewer and/or additional components in varying arrangements.

3.0. Functional Overview

Techniques as described herein can be used to separate system software or firmware for embedded devices into mutable and immutable parts or portions. These different portions can be installed or deployed into fixed and swappable/removable storages in an embedded device respectively. A system software/firmware image or portions thereof can be provided to end users operating the embedded devices to support software/firmware programming or reprogramming operations in the field using new or repaired/ reformatted swappable/removable storages.

As a result, the end users can perform relatively simple operations to replace mutable firmware portions using swappable/removable storages. Even if there is anything wrong with a currently installed specific firmware involving the mutable firmware portion, the mutable firmware portion can be relatively easily re-programed or re-installed with a new or fixed version of the mutable firmware portion by way of swappable/removable storages to make the specific firmware or the mutable firmware portion work again.

In addition, the download size of the firmware image to the embedded device can be significantly reduced in many operational scenarios, as most firmware upgrades are not expected to touch the immutable firmware portion but rather only touch the mutable firmware portion. This can further reduce storage costs on the firmware distribution server side as well as reduce bandwidth usage for firmware download or update operations.

3.1. Firmware Mutability

A firmware generation system (e.g., 100 of FIG. 1, etc.) as described herein or a firmware configuration manager (e.g., 102 of FIG. 1, etc.) therein may determine or identify different portions of the firmware source code 104 corresponding to different firmware (image) portions—such as mutable and immutable firmware portions—in specific firmware for one or more embedded devices. Each firmware source code portion in the different portions of the firmware source code 104 may correspond to a respective firmware (image) portion in the different firmware portions.

The specific firmware for the one or more embedded devices may refer to some or all instructions (e.g., code, microcode, firmware/software, etc.) and data attendant to the instructions that are to be stored in storage/memory (component) devices of an embedded device—e.g., each of the one or more embedded devices—and accessed and executed by one or more processors, controllers, microprocessors, microcontrollers, CPUs, GPUs, digital signal processors or DSPs, image signal processors or ISPs, combinations of the foregoing, etc., of the embedded device.

Each of some or all of the different portions of the firmware source code 104 corresponding to the different firmware portions of the specific firmware for the embedded devices may be determined or identified by the firmware configuration manager 102 based on one or more or any combination of: firmware (portion) determination factors. The firmware configuration manager 102 may establish or ascertain some or all of the firmware determination factors using interactive user input provided through a user interface (UI) and/or firmware source code configuration settings.

In a first example, the firmware configuration manager 102 may determine or identify some or all of the different portions of the firmware source code 104 based on different types of firmware storage or memory devices used to store or run the corresponding different firmware portions—as respectively generated from the different portions of the firmware source code 104—at installation time and/or at firmware runtime.

More specifically, the firmware configuration manager 102 may establish or determine that one or more first code artifacts, packages, units or files in the firmware source code 104 constitute a first firmware source code portion, in response to determining that a first firmware (image) portion—such as a mutable firmware (image) portion 110 of FIG. 1 in the different firmware portions of the specific firmware—to be generated from these code artifacts, packages, units or files is to be installed in a first (e.g., swappable, removable, 208 of FIG. 2, runtime/installation time, etc.) type of firmware storage/memory device of the embedded devices.

In comparison, the firmware configuration manager 102 may establish or determine that one or more second code artifacts, packages, units or files (different from and/or in addition to the first code artifacts, packages, units or files) in the firmware source code 104 constitute a second firmware source code portion, in response to determining that a second different firmware (image) portion—such as an immutable firmware (image) portion 108 of FIG. 1 in the different firmware portions of the specific firmware—to be generated from these code artifacts, packages, units or files is to be installed in a second (e.g., fixed, permanently affixed, soldered-on, irremovable, 204 of FIG. 2, runtime/installation time, etc.) type of firmware storage/memory device of the embedded devices. For instance, at runtime, the second (immutable) firmware portion is expected to generate no or few program/write/erase operations to the firmware storage/memory device of the second type. Additionally, optionally or alternatively, even when the second (immutable) firmware portion may be expected to generate relatively frequent program/write/erase operations per unit time at runtime, the firmware storage/memory device of the second type can well support these operations over a relatively long time period that is comparable with or longer than expected lifetime of the embedded device or that is longer than the time interval between two successive major releases/versions of the specific firmware.

In a second example, the firmware configuration manager 102 may determine or identify some or all of the different portions of the firmware source code 104 based on stability or change frequency of these firmware source code portions.

More specifically, the firmware configuration manager 102 may establish or determine that one or more third code artifacts, packages, units or files in the firmware source code 104 constitute a third (e.g., immutable, 108 of FIG. 1, etc.) firmware source code portion, in response to determining that the third code artifacts, packages, units or files have no or little changes—which would not affect working logics or functions within or without the specific firmware—over a relatively long time period (e.g., over multiple major releases, over multiple months or years, etc.). The relatively long time period may be specified, defined or represented with a first time period threshold.

In comparison, the firmware configuration manager 102 may establish or determine that one or more fourth code artifacts, packages, units or files (different from and/or in addition to the first code artifacts, packages, units or files) in the firmware source code 104 constitute a fourth (e.g., mutable, 110 of FIG. 1, etc.) firmware source code portion, in response to determining that the fourth code artifacts, packages, units or files have changes—which add, delete or modify new or existing program constructs that would affect working logics or functions within or without the specific firmware—over a relatively short time period (e.g., within or between successive major releases or patch releases, etc.). The relatively short time period may be specified, defined or represented with a second time period threshold. In some operational scenarios, whether a code artifacts, package, unit or file has changes affecting functions or logics of the specific firmware and hence qualified as mutable may be determined based on user input and/or firmware configuration management rules implemented by the firmware configuration manager 102.

In some operational scenarios, the first time period threshold may be configured or specified to be the same as the second time period threshold. In some other operational scenarios, the first time period threshold may be configured or specified to be different from or longer than the second time period threshold.

In a third example, the firmware configuration manager 102 may determine or identify some or all of the different portions of the firmware source code 104 based on whether or not these firmware source code portions generate runtime firmware write, delete or update/modify operations to the specific firmware, for example relating to configuration data changes or logging/trace.

More specifically, the firmware configuration manager 102 may establish or determine that one or more fifth code artifacts, packages, units or files in the firmware source code 104 constitute a fifth (e.g., immutable, 108 of FIG. 1, etc.) firmware source code portion, in response to determining that the fifth code artifacts, packages, units or files do not generate runtime firmware write, delete or update/modify operations to the specific firmware.

In comparison, the firmware configuration manager 102 may establish or determine that one or more sixth code artifacts, packages, units or files (different from and/or in addition to the first code artifacts, packages, units or files) in the firmware source code 104 constitute a sixth (e.g., mutable, 110 of FIG. 1, etc.) firmware source code portion, in response to determining that the fourth code artifacts, packages, units or files generate runtime firmware write, delete or update/modify operations to the specific firmware.

In some operational scenarios, one or more embedded applications supported by the specific firmware—or kernel, loader, other basic or low-level embedded system services therein—may include specific configuration data (or portions) represented as functions, curves, operational parameters specifying functions or curves, lookup tables representing functions or curves, etc. Such configuration data may, but is not necessarily limited to only, be used in computing operations such as cryptographic processing operations. Relatively frequent changes or enhancements to the specific configuration data may be made within two successive major releases/versions. Such specific configuration data may be included in a mutable firmware portion as described herein.

In comparison, the kernel, loader, other basic or low-level embedded system services in the specific firmware to support the embedded applications may include second specific configuration data that hardly change between successive major releases/versions or that even if the second specific configuration data experiences some runtime changes during operations, these runtime changes are transient and need not to be saved into the specific firmware. Such second specific configuration data may be included in an immutable firmware portion as described herein.

In some operational scenarios, the embedded applications supported by the specific firmware—or kernel, loader, other basic or low-level embedded system services therein—may generate specific runtime states during operations. Such runtime states may, but are not necessarily limited to only, be used in computing operations such as cryptographic processing operations. Relatively frequent changes to the specific runtime states may be made over a relatively short period of time such as every fractional seconds, every few seconds, every few minutes, etc. To support high availability and/or fault tolerant operations, these specific runtime states may be persisted, logged or saved as a part of the specific firmware or as a part of a firmware storage space hosting the specific firmware. The specific persisted/saved/logged states may be used as checkpoints to be used for relatively fast recovery operations following an embedded application failure or an out-of-service or abnormal termination event. Firmware source code artifacts, packages, units or files in which these specific states are represented or logged may be included in a mutable firmware portion as described herein.

In comparison, the kernel, loader, other basic or low-level embedded system services in the specific firmware to support the embedded applications may generate second specific runtime states during operations. Such runtime states may, but are not necessarily limited to only, be used in kernel, loader, other basic or low-level embedded system services computing operations, network protocol stacks, etc. Some or all of the kernel, loader, other basic or low-level embedded system services may run in a shadow memory to the specific firmware such as RAM. These runtime states are transient, may be of no or little use when the kernel, loader, other basic or low-level embedded system services are re-initialized or rebooted, and hence need not to be persisted, saved or logged into the specific firmware. Firmware source code artifacts, packages, units or files for the kernel, loader, other basic or low-level embedded system services may be included in an immutable firmware portion as described herein.

For the purpose of illustration, it has been described that specific firmware for embedded devices may be partitioned into an immutable firmware portion and a mutable firmware portion. It should be noted that, in other operational scenarios, more than two firmware portions may be identified in specific firmware for embedded devices. As a non-limiting example, in addition to the immutable and mutable firmware portions, one or more intermediate (e.g., intermediate mutable, etc.) firmware portions in the specific firmware. Each of some or all firmware portions identified in the specific firmware based on mutability criteria or thresholds (e.g., the first and second time period threshold, a third time period threshold, etc.) may be installed or run from a respective firmware storage/memory space among a plurality of firmware storage/memory space of an (e.g., intended, targeted, built for, etc.) embedded device.

3.2. Firmware Deployment

FIG. 3A illustrates example firmware building and deployment operations, which may be implemented or performed by one or more computing devices such as a firmware generation system (e.g., 100 of FIG. 1, etc.), a firmware distribution system, one or more end-user computing devices, one or more embedded devices (e.g., 200 of FIG. 2, etc.), and so on.

As shown in FIG. 3A, the firmware configuration manager 102 of FIG. 1 performs firmware configuration operations 302 to provide directives and/or operational parameters to the firmware builder 106 of FIG. 1 to carry out a firmware building process. The directives and/or operational parameters in the firmware building process, as specified, defined or provided by the firmware configuration manager 102, may include specifications of which firmware feature packages, files, code portions, artifacts, etc., in the firmware source code 104 of FIG. 1 belong to the immutable firmware portion and of which other firmware feature packages, files, code portions, artifacts, etc., in the firmware source code 104 belong to the mutable firmware portion.

Based at least in part on the directives and/or operational parameters provided by the firmware configuration manager 102 and some or all of the firmware source code 104, the firmware builder 106 carry out or perform the firmware building process to generate an image of specific firmware for the embedded devices. The firmware building process may include or implement an immutable firmware building process 304 that generates or builds (e.g., through compilation and/or linking, etc.) an immutable firmware (image) portion 108 of the specific firmware and a mutable firmware building process 306 that generates or builds (e.g., through compilation and/or linking, etc.) a mutable firmware (image) portion 110 of the specific firmware.

The firmware generation system 100 of FIG. 1 may operate with other computing systems such as one or more firmware distribution systems, one or more end-user computing devices, firmware programmers to perform operations 308 and/or 310 for programming firmware in fixed and/or swappable storage devices, etc., to install/write/program the immutable firmware portion 108 into the one or more fixed storage devices 204 of FIG. 2 and to install/write/program the mutable firmware portion 110 into the one or more swappable storage devices 206 of FIG. 2.

3.3. Firmware Repairing

Figure 3B:
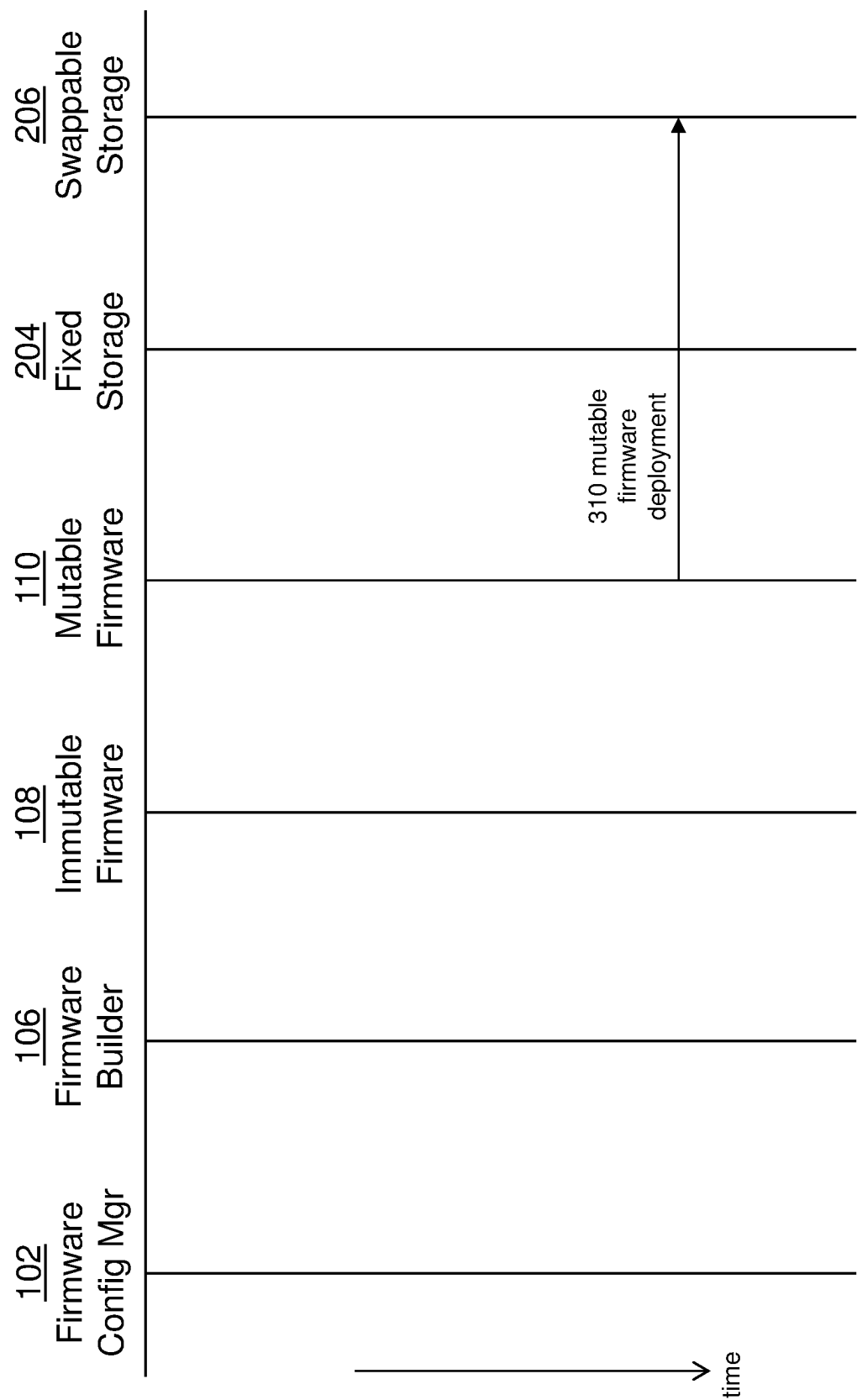

FIG. 3B illustrates example firmware reprogramming operations in the field, which may be implemented or performed by one or more computing devices such as one or more end-user computing devices, one or more embedded devices (e.g., 200 of FIG. 2, etc.), and so on.

Specific firmware (e.g., 108 and 110 of FIG. 1 or FIG. 2, etc.) installed or deployed with an embedded device 200 through one or more fixed storage devices 204 and/or one or more swappable storage devices 206 may need to be programmed, reprogrammed, updated, repaired and/or replaced in the field. For example, a mutable firmware portion 110 of the specific firmware 108 and 110 installed or deployed with the embedded device 200 through the swappable storage devices 206 may need to be repaired or replaced when present computer readable media of the swappable storage devices 206—which stores or hosts the mutable firmware portion 110 of the specific firmware—become corrupted or inoperable.

As shown in FIG. 3B, in response to determining that the current mutable firmware portion 110 installed or deployed through the swappable storage devices 206 is to be programmed, reprogrammed, updated, repaired and/or replaced in the field, the embedded device 200 can operate with one or more of the firmware generation system 100 of FIG. 1, firmware distribution systems, end-user computing devices, firmware programmers, and so on to perform operations 310 for programming or reprogramming the mutable firmware portion 110 in the swappable storage devices 206 to install/write/program a designated version of the mutable firmware portion 110 into the one or more swappable storage devices 206.

The designated version of the mutable firmware portion 110—which may be previously generated by the firmware builder 106 of FIG. 1—may be accessed, for example, from the firmware generation system 100 or a firmware distribution/download server operating in conjunction therewith. The computer readable media (e.g., a flash drive, etc.) storing the current mutable firmware portion 110 may be removed from swappable storage device physical connector(s) in the embedded device 200. New or repaired computer readable media (e.g., a flash drive, etc.) storing (e.g., programmed, reprogrammed, repaired or updated with, etc.) the designated version of the mutable firmware portion 110 may be removably inserted or physically (e.g., electrically, mechanically, optically, etc.) connected into the swappable storage device physical connector(s) in the embedded device 200.

3.4. Firmware Updates

Figure 3C:
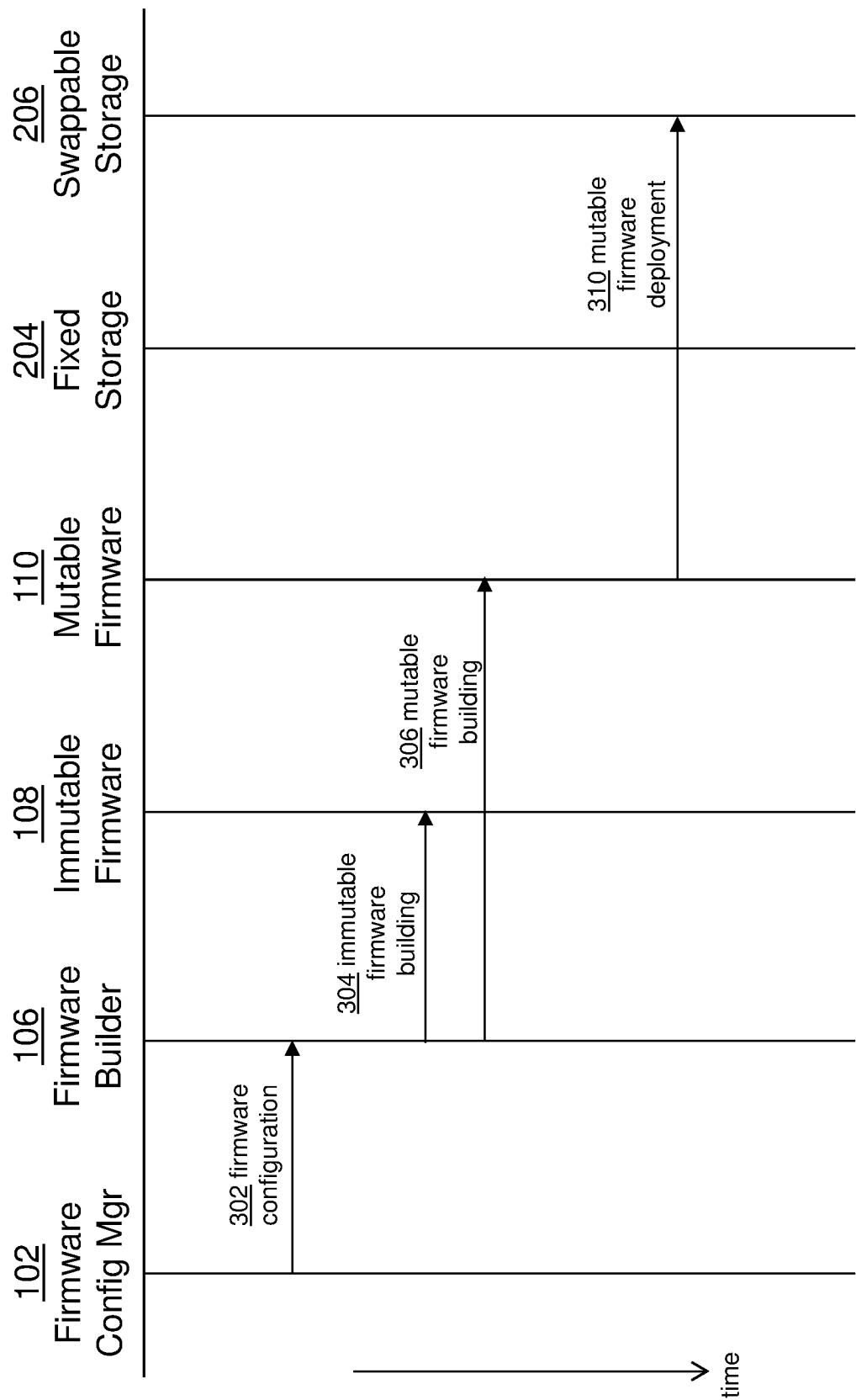

FIG. 3C illustrates example firmware updating operations, which may be implemented or performed by one or more computing devices such as a firmware generation system (e.g., 100 of FIG. 1, etc.), a firmware distribution system, one or more end-user computing devices, one or more embedded devices (e.g., 200 of FIG. 2, etc.), and so on.

Specific firmware (e.g., 108 and 110 of FIG. 1 or FIG. 2, etc.) installed or deployed with an embedded device 200 through one or more fixed storage devices 204 and/or one or more swappable storage devices 206 may need to be programmed, reprogrammed, updated, and/or replaced in the field. For example, firmware source code 104 of FIG. 1 may be continuously maintained and updated with new or modified features/packages. Changes may be made to the firmware source code 104 to remove outdated features/packages or to fix bugs in existing or deployed versions of the specific firmware in the field.

Changes made to the firmware source code 104 can cause a new version of the specific firmware built with the changes to be different from a current version of the specific firmware installed or deployed with an embedded device 200 in the field.

In a first example, the new version of the specific firmware may include a new version of an immutable firmware portion, which is different from a current version of an immutable firmware portion in the current version of the specific firmware. Additionally, optionally or alternatively, the new version of the specific firmware may also include a new version of a mutable firmware portion, which is different from a current version of a mutable firmware portion in the current version of the specific firmware. The new version of the specific firmware that includes a different new version of the immutable firmware portion may represent a major release/version of the specific firmware. Installing, programming/reprogramming, updating and/or replacing the current version of the specific firm in the field with the new (major release or) version of the specific firmware may cause an end user operating the embedded device to incur relatively long embedded device downtime and involve relatively complicated firmware programming/reprogramming operations.

In a second example, as illustrated in FIG. 3C, the new version of the specific firmware may include a new version of an immutable firmware portion, which is the same as or identical with (in terms of bytecode or machine code) a current version of an immutable firmware portion in the current version of the specific firmware. However, the new version of the specific firmware may include a new version of a mutable firmware portion, which is different from a current version of a mutable firmware portion in the current version of the specific firmware. The new version of the specific firmware that includes a different new version of the mutable firmware portion may represent a minor release/version of the specific firmware. Installing, programming, reprogramming, updating and/or replacing the current version of the specific firm in the field with the new (minor release or) version of the specific firmware may cause an end user operating the embedded device to incur no or little embedded device downtime and involve relatively simple firmware programming/reprogramming operations in swapping out the current version of the mutable firmware portion of the specific firmware by way of the one or more swappable storage devices 206.

As shown in FIG. 3C, the firmware configuration manager 102 of FIG. 1 performs firmware configuration operations 302 to provide (e.g., new, update, second, etc.) directives and/or operational parameters to the firmware builder 106 of FIG. 1 to carry out a (e.g., new, update, second, etc.) firmware building process. The directives and/or operational parameters in the firmware building process, as specified, defined or provided by the firmware configuration manager 102, may include specifications of which (e.g., new, update, existing, etc.) firmware feature packages, files, code portions, artifacts, etc., in the firmware source code 104 of FIG. 1 belong to the immutable firmware portion and of which other (e.g., new, update, existing, etc.) firmware feature packages, files, code portions, artifacts, etc., in the firmware source code 104 belong to the mutable firmware portion.

Based at least in part on the directives and/or operational parameters provided by the firmware configuration manager 102 and some or all of the firmware source code 104, the firmware builder 106 carry out or perform the firmware building process to generate a new version (or new image) of specific firmware for the embedded devices. The firmware building process may include or implement an immutable firmware building process 304 that generates or builds (e.g., through compilation and/or linking, etc.) a new version of the immutable firmware (image) portion 108 of the specific firmware and a mutable firmware building process 306 that generates or builds (e.g., through compilation and/or linking, etc.) a new version of the mutable firmware (image) portion 110 of the specific firmware.

The firmware generation system 100 of FIG. 1 may determine or verify whether the new version of the immutable firmware (image) portion 110 is the same as or identical with (in terms of bytecode, executable code, binary comparison of respective binary codes, etc.) an existing version of the immutable firmware (image) portion 110 that is installed in the field with one or more embedded devices (e.g., 200 of FIG. 2, etc.).

In some operational scenarios, in response to determining or verifying that the new version of the immutable firmware (image) portion 110 is different from (in terms of bytecode, executable code, binary comparison of respective binary codes, etc.) the existing version of the immutable firmware (image) portion 110, the firmware generation system 100 may identify specific changes to the immutable firmware portion and include these changes in the mutable firmware portion to be released or deployed in the field.

In some operational scenarios, the subsequent operations of FIG. 3C may be performed in response to verifying that the new version of the immutable firmware (image) portion 110 is the same as or identical with (in terms of bytecode, executable code, binary comparison of respective binary codes, etc.) the existing version of the immutable firmware (image) portion 110.

As shown in FIG. 3C, in response to determining that the current mutable firmware portion 110 installed or deployed through the swappable storage devices 206 is to be programmed, reprogrammed and/or replaced in the field, the embedded device 200 can operate with one or more of the firmware generation system 100 of FIG. 1, firmware distribution systems, end-user computing devices, firmware programmers, and so on to perform operations 310 for programming or reprogramming the mutable firmware portion 110 in the swappable storage devices 206 to install/write/program the new version of the mutable firmware portion 110 into the one or more swappable storage devices 206.

The new version of the mutable firmware portion 110 may be accessed, for example, from the firmware generation system 100 or a firmware distribution/download server operating in conjunction therewith. The current computer readable media (e.g., a flash drive, etc.) or the current swappable storage devices 206 storing the current mutable firmware portion 110 in the embedded device 200 may not be removed from swappable storage device physical connector(s) in the embedded device 200, while new computer readable media (e.g., a flash drive, etc.) or one or more new swappable storage devices are being used to store or programmed with the new version of the mutable firmware portion 110.

For example, a computer device operated by the end user may be used to access or download the new version of the mutable firmware portion 110 from a firmware generation/distribution system and copied/saved or otherwise programmed into the new computer readable media or the new swappable storage devices. Once the programming of the new computer media or swappable storage devices is finished, the current computer readable media (e.g., a flash drive, etc.) or the current swappable storage devices installed in or connected with the physical connectors of the embedded device 200 may be removed and the new computer media may be removably inserted or physically (e.g., electrically, mechanically, optically, etc.) connected into the swappable storage device physical connector(s) in the embedded device 200.

In some operational scenarios, the embedded device 200 may support hot swapping operations with the swappable storage devices in the physical connectors with no or little adverse impact, for example while the embedded device is continuously operating normally or for a relatively limited time period.

3.5. Example Process Flows

Figure 4:
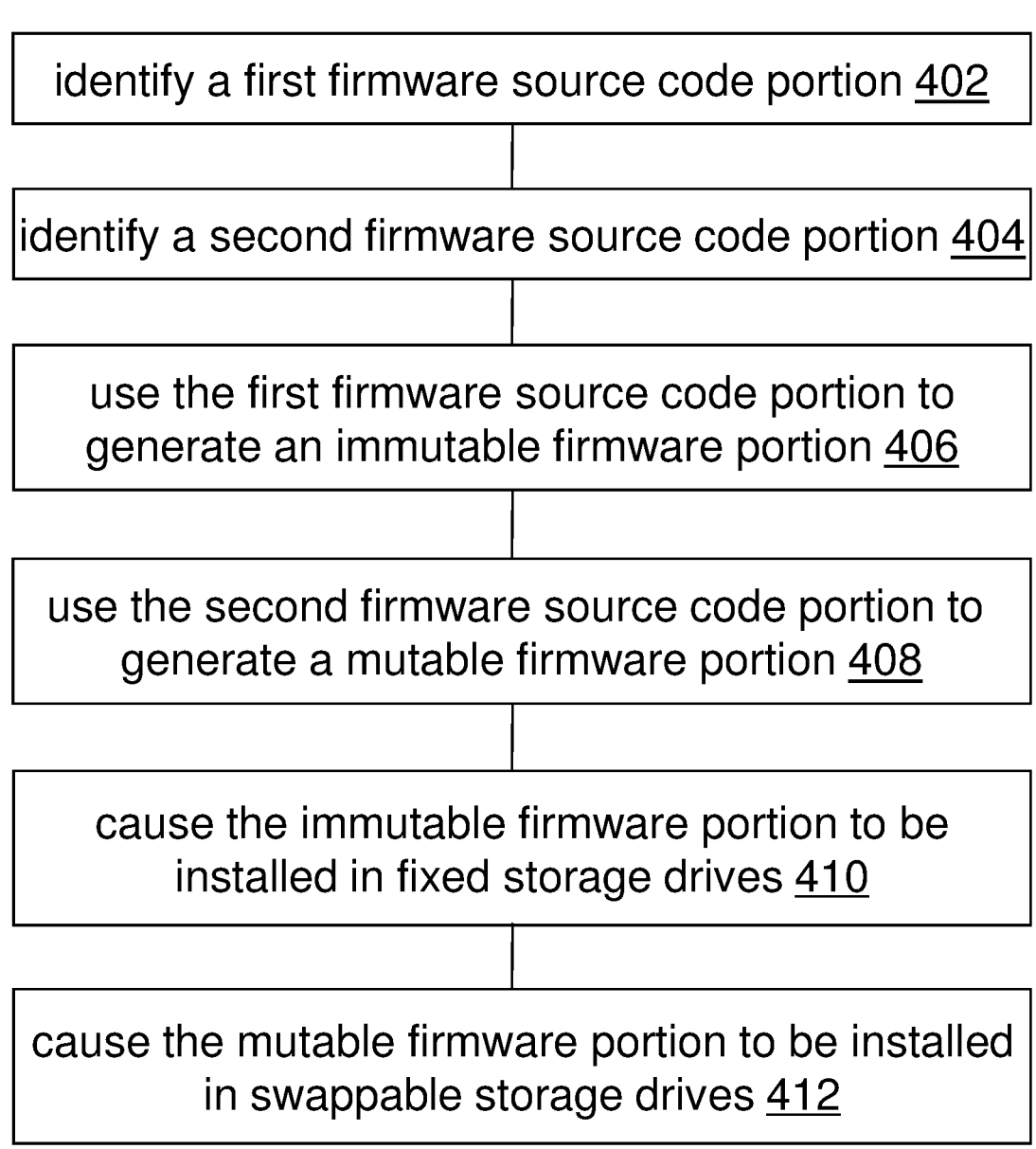
FIG. 4 illustrates an example process flow.

FIG. 4 illustrates an example process flow, according to an embodiment. The various elements of the flow described below may be performed with one or more computing devices. In block 402, a firmware generation system (e.g., 100 of FIG. 1, etc.) identifies a first firmware source code portion corresponding to an immutable firmware portion of specific firmware to be deployed with one or more embedded devices.

In block 404, the system identifies a second different firmware source code portion corresponding to a mutable firmware portion of the specific firmware to be deployed with the one or more embedded devices.

In block 406, the system uses the first firmware source code portion to generate the immutable firmware portion of the specific firmware.

In block 408, the system uses the second firmware source code portion to generate the mutable firmware portion of the specific firmware.

In block 410, the system causes the immutable firmware portion of the specific firmware to be installed in one or more fixed storage drives of an embedded device in the one or more embedded devices.

In block 412, the system causes the mutable firmware portion of the specific firmware to be installed in one or more swappable storage drives of the same embedded device.

In an embodiment, a specific firmware sub-portion is identified to be a part of the mutable firmware portion based on whether the specific firmware sub-portion is to be installed in a swappable storage device.

In an embodiment, a new version of the mutable firmware portion is generated from an updated version of the second firmware source code portion while the immutable firmware portion is unchanged; the new version of the mutable firmware portion is installed into the embedded device without touching the immutable firmware portion already installed in the embedded device.

In an embodiment, the mutable firmware portion installed with the embedded device becomes corrupted; the mutable firmware portion is replaced and reinstalled into the one or more swappable storage devices.

In an embodiment, the second firmware source code portion used to generate the mutable firmware portion is identified based at least in part on whether the mutable firmware portion generates runtime writes to persist runtime data absent from a release version of the mutable firmware portion installed with the embedded device.

In an embodiment, the second firmware source code portion used to generate the mutable firmware portion is identified based at least in part on user input indicating that the mutable firmware portion is to be updated relatively frequently after the mutable firmware portion is installed with the embedded device.

In an embodiment, the immutable firmware portion includes one or more executable files for kernel, loader, other embedded system services, etc.; the mutable firmware portion includes one or more executable files for one or more embedded applications.

In an embodiment, a computing device such as a server, one or more computing processors or chips or chipsets on a server board, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

4.0. Implementation Mechanism-Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 5:
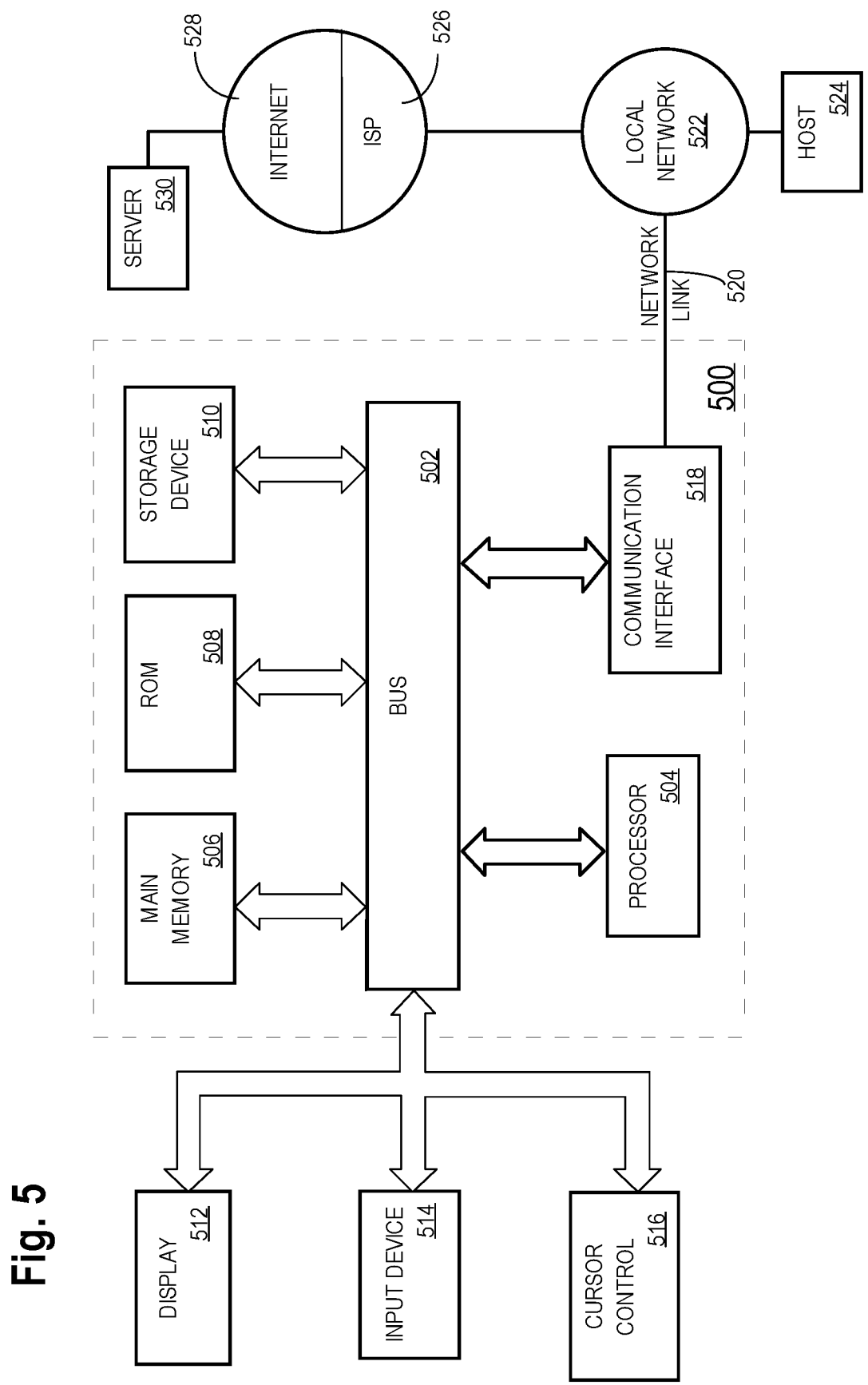
FIG. 5 is block diagram of a computer system upon which embodiments of the inventive subject matter may be implemented.

FIG. 5 is a block diagram that illustrates a computer system 500 that may be utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device. In an embodiment, FIG. 5 is a different view of the devices and systems described in previous sections.

Computer system 500 may include one or more ASICs, FPGAs, or other specialized circuitry 503 for implementing program logic as described herein. For example, circuitry 503 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 500 may include one or more hardware processors 504 configured to execute software-based instructions. Computer system 500 may also include one or more busses 502 or other communication mechanism for communicating information. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes one or more memories 506, such as a RAM, hardware registers, or other dynamic or volatile storage device for storing data units to be processed by the one or more ASICs, FPGAs, or other specialized circuitry 503. Memory 506 may also or instead be used for storing information and instructions to be executed by processor 504. Memory 506 may be directly connected or embedded within circuitry 503 or a processor 504. Or, memory 506 may be coupled to and accessed via bus 502. Memory 506 also may be used for storing temporary variables, data units describing rules or policies, or other intermediate information during execution of program logic or instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, may optionally be provided and coupled to bus 502 for storing information and instructions.

A computer system 500 may also include, in an embodiment, one or more communication interfaces 515 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send packets and receive data through the network(s), network link 520, and communication interface 518. In some embodiments, this data may be data units that the computer system 500 has been asked to process and, if necessary, redirect to other computer systems via a suitable network link 520. In other embodiments, this data may be instructions for implementing various processes related to the described techniques. For instance, in the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

Computer system 500 may optionally be coupled via bus 502 to one or more displays 512 for presenting information to a computer user. For instance, computer system 500 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

One or more input devices 514 are optionally coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

As discussed, computer system 500 may implement techniques described herein using customized hard-wired logic, one or more ASICs or FPGAs 503, firmware and/or program logic, which in combination with the computer system causes or programs computer system 500 to be a special-purpose machine. According to one embodiment, however, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   identifying a first firmware source code portion corresponding to an immutable firmware portion of specific firmware to be deployed with one or more embedded devices;
   identifying a second different firmware source code portion corresponding to a mutable firmware portion of the specific firmware to be deployed with the one or more embedded devices, wherein the first firmware source code portion and the second firmware source code portion are distinct from each other;
   wherein the second firmware source code portion used to generate the mutable firmware portion is identified based at least in part on whether the mutable firmware portion generates runtime writes to persist runtime data absent from a release version of the mutable firmware portion installed with the embedded device;
   using the first firmware source code portion to generate the immutable firmware portion of the specific firmware;
   using the second firmware source code portion to generate the mutable firmware portion of the specific firmware;
   wherein updates to the first and second firmware source code portions are monitored and used by a firmware configuration manager to specify one or more operational parameters used by a firmware builder to generate the mutable and immutable firmware portions;
   causing the immutable firmware portion of the specific firmware to be installed in one or more fixed storage drives of an embedded device in the one or more embedded devices;
   causing the mutable firmware portion of the specific firmware to be installed in one or more swappable storage drives of the same embedded device.

2. The method of claim 1, wherein a specific firmware sub-portion is identified to be a part of the mutable firmware portion based on whether the specific firmware sub-portion is to be installed in a swappable storage device.

3. The method of claim 1, wherein a new version of the mutable firmware portion is generated from an updated version of the second firmware source code portion while the immutable firmware portion is unchanged; wherein the new version of the mutable firmware portion is installed into the embedded device without touching the immutable firmware portion already installed in the embedded device.

4. The method of claim 1, wherein the mutable firmware portion installed with the embedded device becomes corrupted; wherein the mutable firmware portion is replaced and reinstalled into the one or more swappable storage devices.

5. The method of claim 1, wherein the one or more swappable storage derives is removably attached to the embedded device.

6. The method of claim 1, wherein the second firmware source code portion used to generate the mutable firmware portion is identified based at least in part on user input indicating that the mutable firmware portion is to be updated relatively frequently after the mutable firmware portion is installed with the embedded device.

7. The method of claim 1, wherein the immutable firmware portion includes one or more executable files for kernel, loader and other embedded system services; wherein the mutable firmware portion includes one or more executable files for one or more embedded applications.

8. An apparatus comprising:
   one or more computing processors; and
   one or more non-transitory computer readable media storing instructions that, when executed by the one or more computing processors, cause performance of:
      identifying a first firmware source code portion corresponding to an immutable firmware portion of specific firmware to be deployed with one or more embedded devices;
      identifying a second different firmware source code portion corresponding to a mutable firmware portion of the specific firmware to be deployed with the one or more embedded devices, wherein the first firmware source code portion and the second firmware source code portion are distinct from each other;
      wherein the second firmware source code portion used to generate the mutable firmware portion is identified based at least in part on whether the mutable firmware portion generates runtime writes to persist runtime data absent from a release version of the mutable firmware portion installed with the embedded device;
      using the first firmware source code portion to generate the immutable firmware portion of the specific firmware;
      using the second firmware source code portion to generate the mutable firmware portion of the specific firmware;
      wherein updates to the first and second firmware source code portions are monitored and used by a firmware configuration manager to specify one or more operational parameters used by a firmware builder to generate the mutable and immutable firmware portions;
      causing the immutable firmware portion of the specific firmware to be installed in one or more fixed storage drives of an embedded device in the one or more embedded devices;
      causing the mutable firmware portion of the specific firmware to be installed in one or more swappable storage drives of the same embedded device.

9. The apparatus of claim 8, wherein a specific firmware sub-portion is identified to be a part of the mutable firmware portion based on whether the specific firmware sub-portion is to be installed in a swappable storage device.

10. The apparatus of claim 8, wherein a new version of the mutable firmware portion is generated from an updated version of the second firmware source code portion while the immutable firmware portion is unchanged; wherein the new version of the mutable firmware portion is installed into the embedded device without touching the immutable firmware portion already installed in the embedded device.

11. The apparatus of claim 8, wherein the mutable firmware portion installed with the embedded device becomes corrupted; wherein the mutable firmware portion is replaced and reinstalled into the one or more swappable storage devices.

12. The apparatus of claim 8, wherein the one or more swappable storage derives is removably attached to the embedded device.

13. The apparatus of claim 8, wherein the second firmware source code portion used to generate the mutable firmware portion is identified based at least in part on user input indicating that the mutable firmware portion is to be updated relatively frequently after the mutable firmware portion is installed with the embedded device.

14. The apparatus of claim 8, wherein the immutable firmware portion includes one or more executable files for kernel, loader and other embedded system services; wherein the mutable firmware portion includes one or more executable files for one or more embedded applications.

15. One or more non-transitory computer readable media storing instructions that, when executed by one or more computing processors, cause performance of:
- identifying a first firmware source code portion corresponding to an immutable firmware portion of specific firmware to be deployed with one or more embedded devices;
- identifying a second different firmware source code portion corresponding to a mutable firmware portion of the specific firmware to be deployed with the one or more embedded devices, wherein the first firmware source code portion and the second firmware source code portion are distinct from each other;
- wherein the second firmware source code portion used to generate the mutable firmware portion is identified based at least in part on whether the mutable firmware portion generates runtime writes to persist runtime data absent from a release version of the mutable firmware portion installed with the embedded device;
- using the first firmware source code portion to generate the immutable firmware portion of the specific firmware;
- using the second firmware source code portion to generate the mutable firmware portion of the specific firmware;
- wherein updates to the first and second firmware source code portions are monitored and used by a firmware configuration manager to specify one or more operational parameters used by a firmware builder to generate the mutable and immutable firmware portions;
- causing the immutable firmware portion of the specific firmware to be installed in one or more fixed storage drives of an embedded device in the one or more embedded devices;
- causing the mutable firmware portion of the specific firmware to be installed in one or more swappable storage drives of the same embedded device.

16. The non-transitory computer readable media of claim 15, wherein a specific firmware sub-portion is identified to be a part of the mutable firmware portion based on whether the specific firmware sub-portion is to be installed in a swappable storage device.

17. The non-transitory computer readable media of claim 15, wherein a new version of the mutable firmware portion is generated from an updated version of the second firmware source code portion while the immutable firmware portion is unchanged; wherein the new version of the mutable firmware portion is installed into the embedded device without touching the immutable firmware portion already installed in the embedded device.

18. The non-transitory computer readable media of claim 15, wherein the mutable firmware portion installed with the embedded device becomes corrupted; wherein the mutable firmware portion is replaced and reinstalled into the one or more swappable storage devices.

19. The non-transitory computer readable media of claim 15, wherein the one or more swappable storage derives is removably attached to the embedded device.

20. The non-transitory computer readable media of claim 15, wherein the second firmware source code portion used to generate the mutable firmware portion is identified based at least in part on user input indicating that the mutable firmware portion is to be updated relatively frequently after the mutable firmware portion is installed with the embedded device.

21. The non-transitory computer readable media of claim 15, wherein the immutable firmware portion includes one or more executable files for kernel, loader and other embedded system services; wherein the mutable firmware portion includes one or more executable files for one or more embedded applications.

* * * * *